(12) United States Patent
Lum et al.

(10) Patent No.: US 7,378,643 B2
(45) Date of Patent: May 27, 2008

(54) OPTICAL PROJECTION ENCODER WITH PATTERNED MASK

(75) Inventors: Chee Foo Lum, Penang (MY); Sai Mun Lee, Penang (MY); Weng Fei Wong, Penang (MY)

(73) Assignee: Avago Technologies General IP Pte Ltd, Singapore (SG)

( * ) Notice: Subject to any disclaimer, the term of this patent is extended or adjusted under 35 U.S.C. 154(b) by 25 days.

(21) Appl. No.: 11/410,679

(22) Filed: Apr. 24, 2006

(65) Prior Publication Data

US 2007/0246646 A1    Oct. 25, 2007

(51) Int. Cl.
*G01D 5/34* (2006.01)
(52) U.S. Cl. .................. 250/231.13; 250/231.14; 250/221; 250/222.1; 356/391; 356/397; 356/616
(58) Field of Classification Search ........ 345/163–166, 345/179; 250/221, 222.2, 231.13–231.18, 250/559.29, 559.39; 356/614–617, 391, 356/393, 396, 397; 382/107, 291
See application file for complete search history.

(56) References Cited

U.S. PATENT DOCUMENTS

| | | | | |
|---|---|---|---|---|
| 4,034,230 A | * | 7/1977 | Brill et al. ................. | 250/568 |
| 5,644,139 A | * | 7/1997 | Allen et al. ................. | 250/557 |
| 6,246,050 B1 | * | 6/2001 | Tullis et al. ........... | 250/231.13 |
| 7,102,122 B2 | * | 9/2006 | Ornellas et al. ........ | 250/231.13 |
| 2005/0073693 A1 | * | 4/2005 | DePue et al. ............... | 356/499 |

* cited by examiner

*Primary Examiner*—Davienne Monbleau

(57) ABSTRACT

An Optical Projecting Encoder ("OPE") having an emitter module for transmitting emitted optical radiation through a mask to a moving object, and a detector module for receiving reflected optical radiation from the moving object. The reflected optical radiation from the moving object may include a predetermined image cast by the mask and a surface texture image from the moving object. The OPE may include a transmissive layer covering both the emitter module and the detector module, where the transmissive layer covering the emitter module collimates the optical radiation from the emitter module, and the transmissive layer covering the detector module concentrates the optical radiation reflected from the moving object to the detector module. The detector module may include an optical navigation sensor that continuously acquires and compares predetermined images cast by the mask and surface texture images from the moving object.

20 Claims, 8 Drawing Sheets

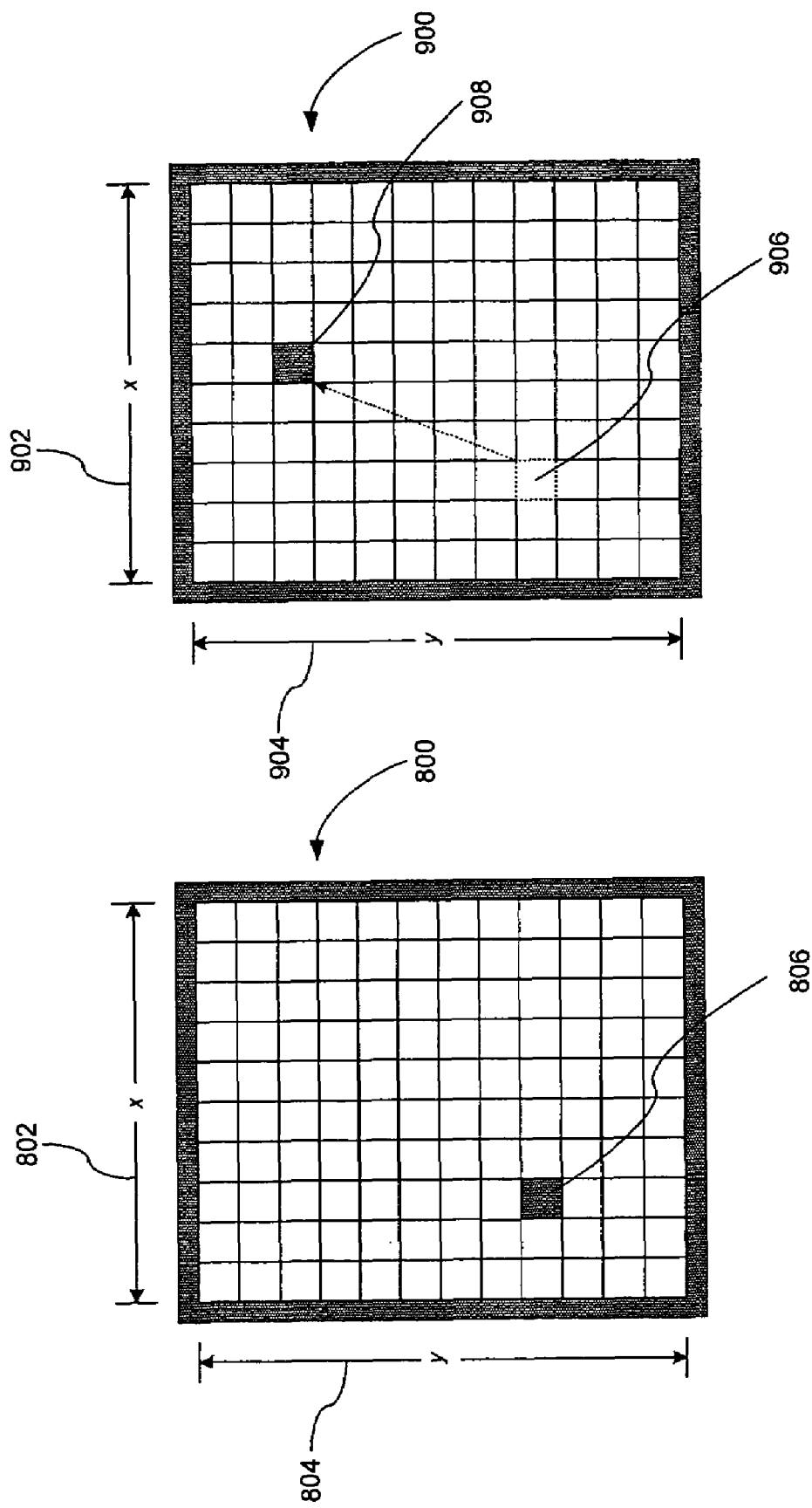

OPTICAL PROJECTION ENCODER WITH PATTERNED MASK

BACKGROUND OF THE INVENTION

Sensors are key feedback devices on many electromechanical systems. There is a wide variety of sensors available and new sensor technologies are continuously being developed. One of the most common position sensors utilized to measure the moving parts within a mechanical system is the optical encoder. An optical encoder is a closed-feedback device that converts motion or positional information into digital signals that may be utilized by a motor control system. As an example, optical encoders detect the position, speed, and direction of components such as print heads in inkjet printers, imaging drums and rollers in laser printers and photocopiers, and scan heads in optical scanners.

Optical encoders produce a digital output based on an encoded media (such as a codewheel or codestrip) that passes either through or by the optical encoder. In general, this encoded media is encoded with alternating light and dark regions (or slots) on the surface of the encoded media. When operated in conjunction with this encoded media, the optical encoder translates rotary or linear motion into a two-channel digital output.

Typically, optical encoders are either linear optical encoders or rotational optical encoders. Linear optical encoders may determine the velocity, acceleration and position of a read-head relative to an encoded media (such as a linear codestrip) utilizing a linear scale, while rotational optical encoders may determine the tangential velocity, acceleration and angular position of a read-head relative to an encoded media (such as a codewheel) utilizing a circular scale. Generally, both linear and rotational optical encoders may be implemented either as transmissive, reflective or imaging optical encoders.

In FIG. 1, a side cross-sectional view of a typical transmissive optical encoder 100 in combination with an encoded medium (such as a codestrip or a codewheel) 102 is shown. The optical encoder 100 may include a read-head 104, where the read-head 104 may include an emitter module 106, and a detector module 108. The read-head 104 and the encoded media 102 may move freely relative to each other in either a linear or a rotational manner based on whether the transmissive optical encoder 100 is either a linear or a rotational, respectively, optical encoder.

The emitter module 106 and the detector module 108 may include optics capable of emitting and detecting, respectively, optical radiation 110 from the emitter module 106 to the detector module 108. The optical radiation 110 may be visible, infrared, and/or ultraviolet light radiation. The emitter module 106 may include a light source (not shown) such as a diode, a light emitting diode ("LED"), photo-cathode, a light bulb, and/or a laser and the detector module 108 may include an array of photo-detectors (not shown) such as photo-diodes, photo-cathodes, and/or photo-multipliers.

In FIG. 2, a side cross-sectional view of a typical reflective optical encoder 200 in combination with an encoded media 202 is shown. The reflective optical encoder 200 may include a read-head 204, where the read-head 204 may include an emitter module 206, and a detector module 208. Similarly to FIG. 1, the read-head 204 and the encoded media 202 may move freely relative to each other in either a linear or a rotational manner based on whether the reflective optical encoder 200 is either a linear or a rotational, respectively, optical encoder.

The emitter module 206 and the detector module 208 may include optics capable of emitting and detecting, respectively, optical radiation from the emitter module 206 to the detector module 208. The optical radiation may include emitted optical radiation 210, which is emitted by the emitter module 206 on to the encoded media 202, and reflected optical radiation 212, which is reflected to the detector module 208 by the encoded media 202.

It is appreciated by those skilled in the art that the optical radiation again may be visible, infrared, and/or ultraviolet light radiation. The emitter module 206 may include a light source (not shown) such as a diode, an LED, photo-cathode, a light bulb, and/or a laser, and the detector module 208 may include an array of photo-detectors (not shown) such as photo-diodes, photo-cathodes, and/or photo-multipliers.

Similarly, in FIG. 3, a side cross-sectional view of a typical imaging optical encoder 300 in combination with an encoded media 302 is shown. The imaging optical encoder 300 may include a read-head 304, where the read-head 304 may include an emitter module 306, and a detector module 308. Similarly to both FIGS. 1 and 2, the read-head 304 and the encoded media 302 may move freely relative to each other in either a linear or rotational manner based on whether the reflective optical encoder 300 is either a linear or a rotational, respectively, optical encoder.

The emitter module 306 and the detector module 308 may include optics capable of emitting and detecting, respectively, optical radiation from the emitter module 306 to the detector module 308. The optical radiation may include emitted optical radiation 310, which is emitted by the emitter module 306 on to the encoded media 302, and reflected optical radiation 312, which is reflected to the detector module 308 by the encoded media 302.

It is appreciated by those skilled in the art that the optical radiation again may be visible, infrared, and/or ultraviolet light radiation. The emitter module 306 may include a light source (not shown) such as a diode, an LED, photo-cathode, a light bulb, and/or a laser, and the detector module 308 may include an array of photo-detectors (not shown) such as photo-diodes, photo-cathodes, and/or photo-multipliers.

In FIG. 4, a top-view of a typical transmissive or reflective linear encoded media 400 utilized as a codestrip by a linear optical encoder (not shown) is shown. The encoded media 400, FIG. 4, may include an alternating pattern of light regions (i.e., light bars 402) and dark regions (i.e., dark bars 404). Utilizing the encoded media 400, the linear optical-encoder may determine the velocity and acceleration of the read-head (not shown) relative to the encoded media 400.

Similarly, in FIG. 5, a top-view of a typical transmissive or reflective linear encoded media 500 utilized as a codewheel on a wheel shaft 502 by a rotational optical encoder (not shown) is shown. The encoded media 500, FIG. 5, may include an alternating pattern of light regions (i.e., light bars 504) and dark regions (i.e., dark bars 506). Utilizing the encoded media 500, the rotational optical encoder may determine the rotational velocity and acceleration of the read-head (not shown) relative to the encoded media 500.

The light and dark regions in both FIGS. 4 and 5 may contain opaque and transparent segments, respectively, that interrupt the optical radiation from the emitter module to the detector module in the optical detector. In the case of a transmissive optical encoder, the optical radiation directly transmitted from the emitter module to the detector module is interrupted by the encoded media; while in the case of the reflective or imaging optical encoder, the optical radiation from the emitter module is either reflected to the detector module by the encoded media or transmitted through the encoded media away from the detector module.

The optical encoder output is then either a binary "ON" or "OFF," depending on whether the optical encoder is over a light or dark region on the encoded media in the transmissive optical encoder or whether the optical radiation is reflected on to the detector module. The electronic signals generated by the optical encoder are then passed to a controller that is capable of determining the position and velocity of the optical detector based upon the received signals.

In general, transmissive optical encoders are capable of operating at high speed and high resolution because of their good contrast capabilities. Unfortunately, however, transmissive optical encoders require packaging designs with high profiles because the emitter module and the detector module have to be placed opposite each other around the encoder media.

Reflective optical encoders have better packaging designs than transmissive optical encoders because the emitter module and detector module are located substantially on the same horizontal plane and may be integrated into a single semiconductor substrate in an integrated circuit. This results in a lower profile packaging design with less materials and less assembly complexity than transmissive optical encoders. Unfortunately, typical reflective optical encoders suffer from lower contrast capabilities than transmissive optical encoders and therefore have limits in speed and resolution compared to transmissive optical encoders.

Imaging optical encoders typically have the same benefits as reflective optical encoders in terms of profile, materials and assembly complexity. However, imaging optical encoders require a diffusive encoded media that at present is not maturely established technologically. Additionally, imaging optical encoders suffer from diffuse reflectance and also have limits in speed and resolution compared to transmissive optical encoders.

In FIG. 6, another side cross-sectional view of a typical reflective optical encoder 600 in combination with an encoded media 602 is shown. The reflective optical encoder 600 may include a read-head 604, where the read-head 604 may include an emitter module 606, and a detector module 608. Similar to FIGS. 1, 2, and 3, the read-head 604 and the encoded media 602 may move freely relative to each other in either a linear or rotational manner based on whether the reflective optical encoder 600 is either a linear or a rotational optical encoder, respectively.

The emitter module 606 and the detector module 608 may include optics capable of emitting and detecting, respectively, optical radiation from the emitter module 606 to the detector module 608. The optical radiation may include emitted optical radiation 610, which is emitted by the emitter module 606 on to the encoded media 602, and reflected optical radiation 612, which is reflected to the detector module 608 by the encoded media 602. Additionally, both emitter module 606 and detector module 608 may be mounted on a common substrate 614. The substrate may be a single semiconductor substrate in an integrated circuit, a lead-frame, an insert-molded lead-frame, a printed circuit board ("PCB"), flexible circuit, ceramics substrate or micro-interconnecting device ("MID").

It is appreciated that the optical radiation again may be visible, infrared, and/or ultraviolet light radiation. The emitter module 606 may include a light source (not shown) such as a diode, a LED, photo-cathode, a light bulb, and/or a laser, and the detector module 608 may include an array of photo-detectors (not shown) such as photo-diodes, photo-cathodes, and/or photo-multipliers.

The optics may include a transmissive layer 616 capable of covering both the emitter module 606 and detector module 608, where the transmissive layer 616 may include any transmissive and moldable material capable of collimating the emitted optical radiation 610 into a parallel beam of optical radiation directed from the emitter module 606 to the encoded media 602, and concentrating the reflected optical radiation 612 into a beam of optical radiation directed at the detector module 608. The transmissive layer 616 may be an epoxy layer.

Because of the higher profile in terms of package design for transmissive optical encoders and the lower contrast capabilities in reflective and imaging optical encoders, there is a need for an improved optical encoder that is capable of providing higher image contrast and resolution than known reflective and imaging optical encoders in a package that is smaller and requires a less complex assembly process than a transmissive encoder.

SUMMARY

An Optical Projection Encoder ("OPE") having an emitter module for transmitting emitted optical radiation to a mask having a predetermined pattern, where the mask creates a masking image having known and fixed dimensions that strikes a moving object whose velocity, acceleration, and position is to be measured, is disclosed. The masking image and the surface texture image of the moving object may be reflected to a detector module that may have a sensor that captures both images. The sensor may then compare the masking image and the surface texture image to determine the position, velocity and acceleration of the moving object. The OPE may include a transmissive layer covering both the emitter module and the detector module.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 8 shows a graphical representation of an image recorded on an optical navigation sensor of a detector module of an OPE taken at time ("t")=zero.

FIG. 9 shows a graphical representation of another image recorded on the optical navigation sensor of the detector module of FIG. 8 taken at t=zero+1.

DETAILED DESCRIPTION

In the following description, reference is made to the accompanying drawings that form a part hereof, and which show, by way of illustration, a specific embodiment in which the invention may be practiced. Other example of implementation may be utilized and structural changes may be made without departing from the scope of the present invention.

As stated above, a problem with known types of transmissive optical encoders is that because the emitter module is placed opposite of the detector module, such an encoder has a higher profile and thus requires a larger package. Reflective and imaging optical encoders allow for a lower-profile design, but also have lower contrast that restricts operation at higher speeds and higher resolutions. In response, an Optical Projection Encoder ("OPE") is described that eliminates the need for an encoded or grating medium such as a codestrip or a codewheel, and is thus capable of providing higher image contrast and resolution in an optical encoder package as small as known transmissive optical encoders.

Figure 1:
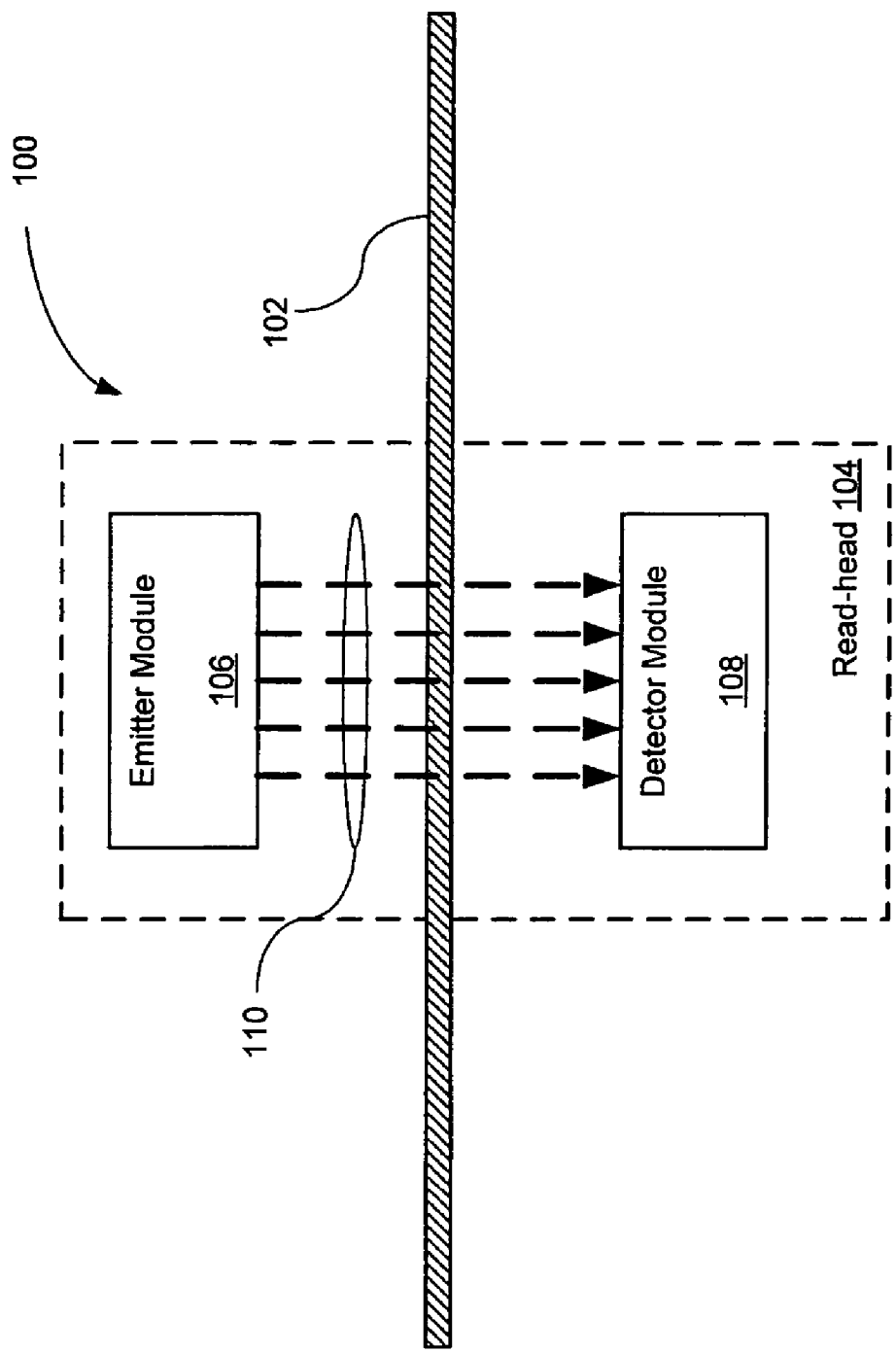
FIG. 1 shows a side cross-sectional view of a typical transmissive optical encoder in combination with an encoded media (such as a codestrip or codewheel).
Figure 2:
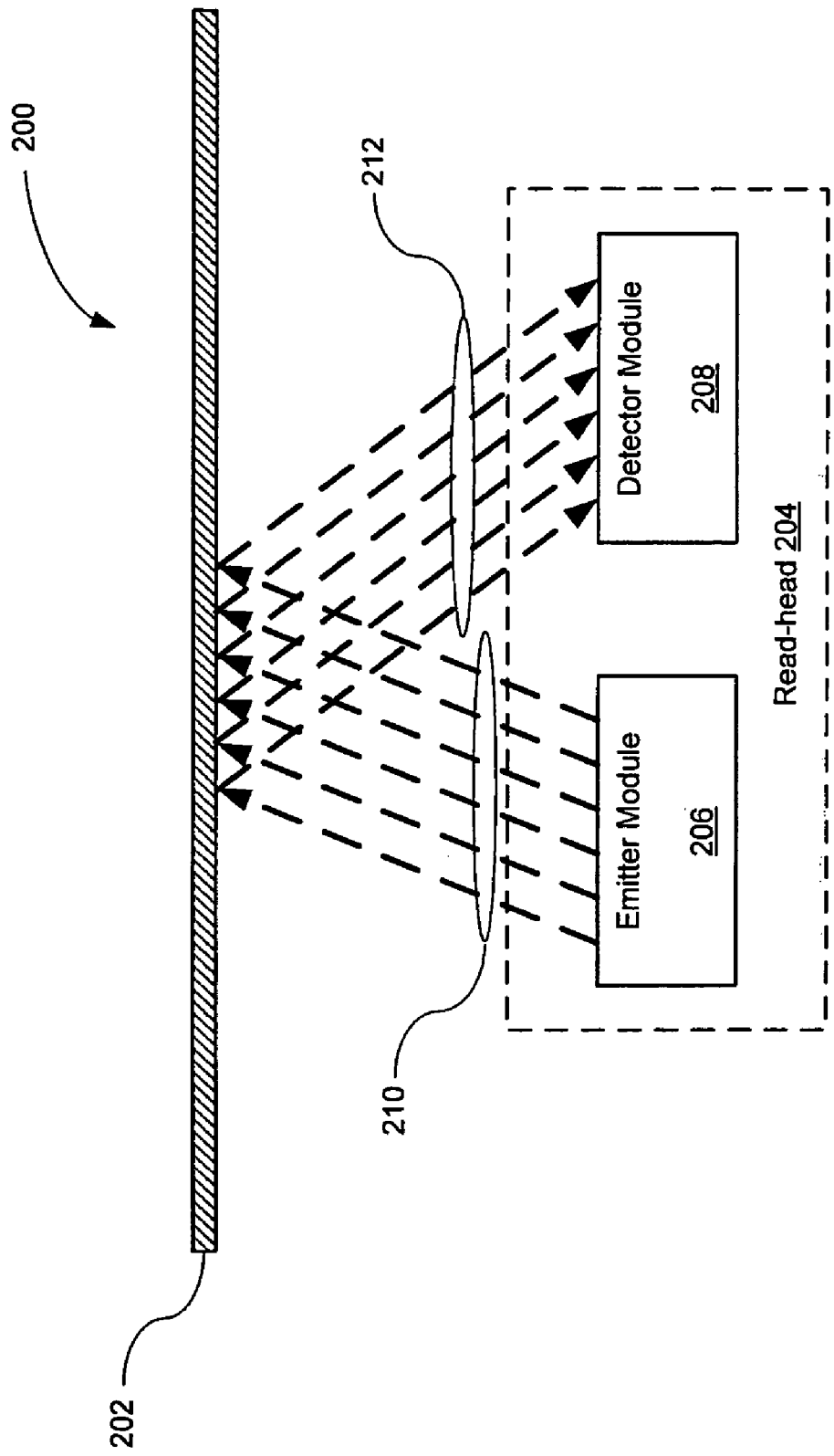
FIG. 2 shows a side cross-sectional view of a typical reflective optical encoder in combination with an encoded media.
Figure 3:
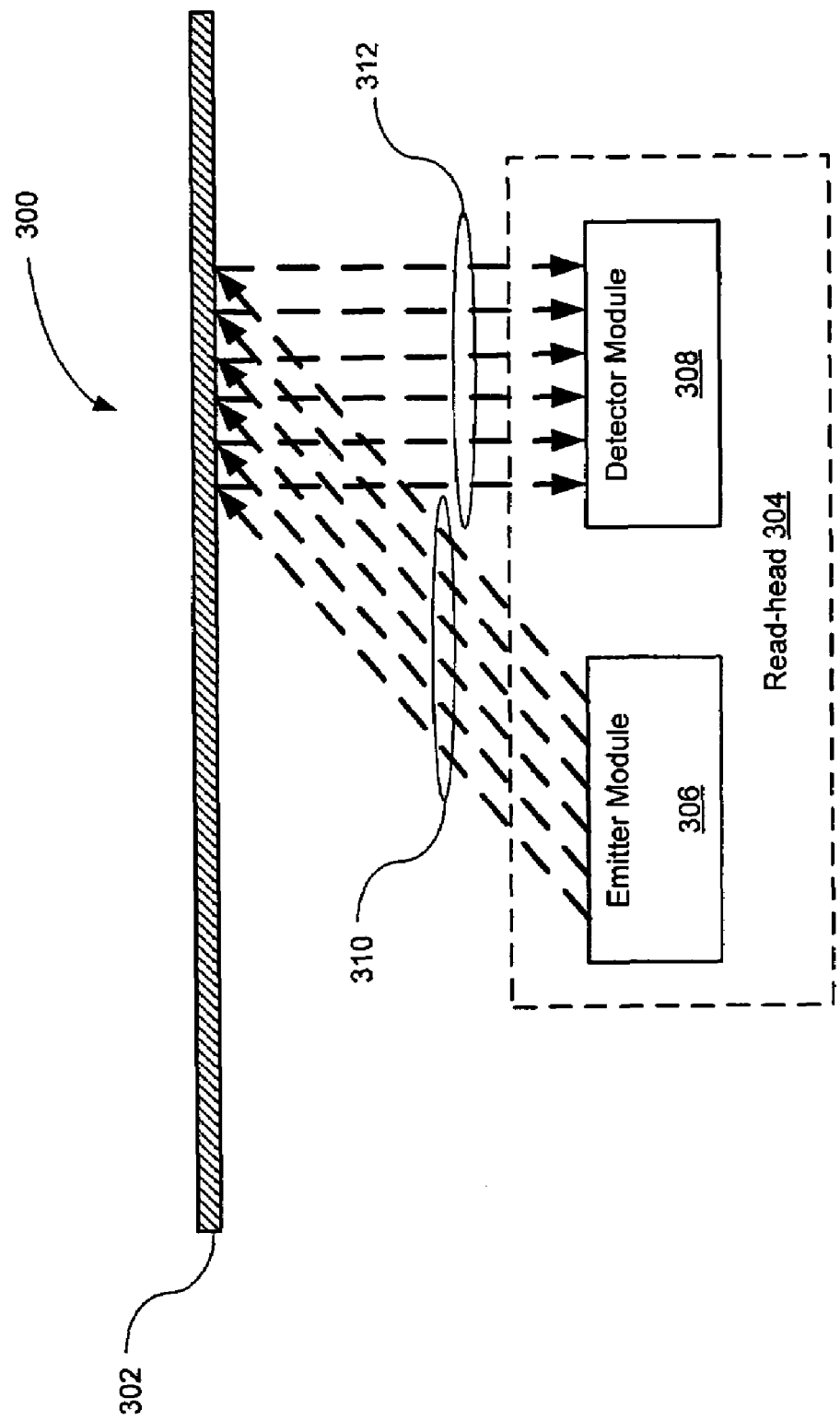
FIG. 3 shows a side cross-sectional view of a typical imaging optical encoder in combination with an encoded media.
Figure 4:
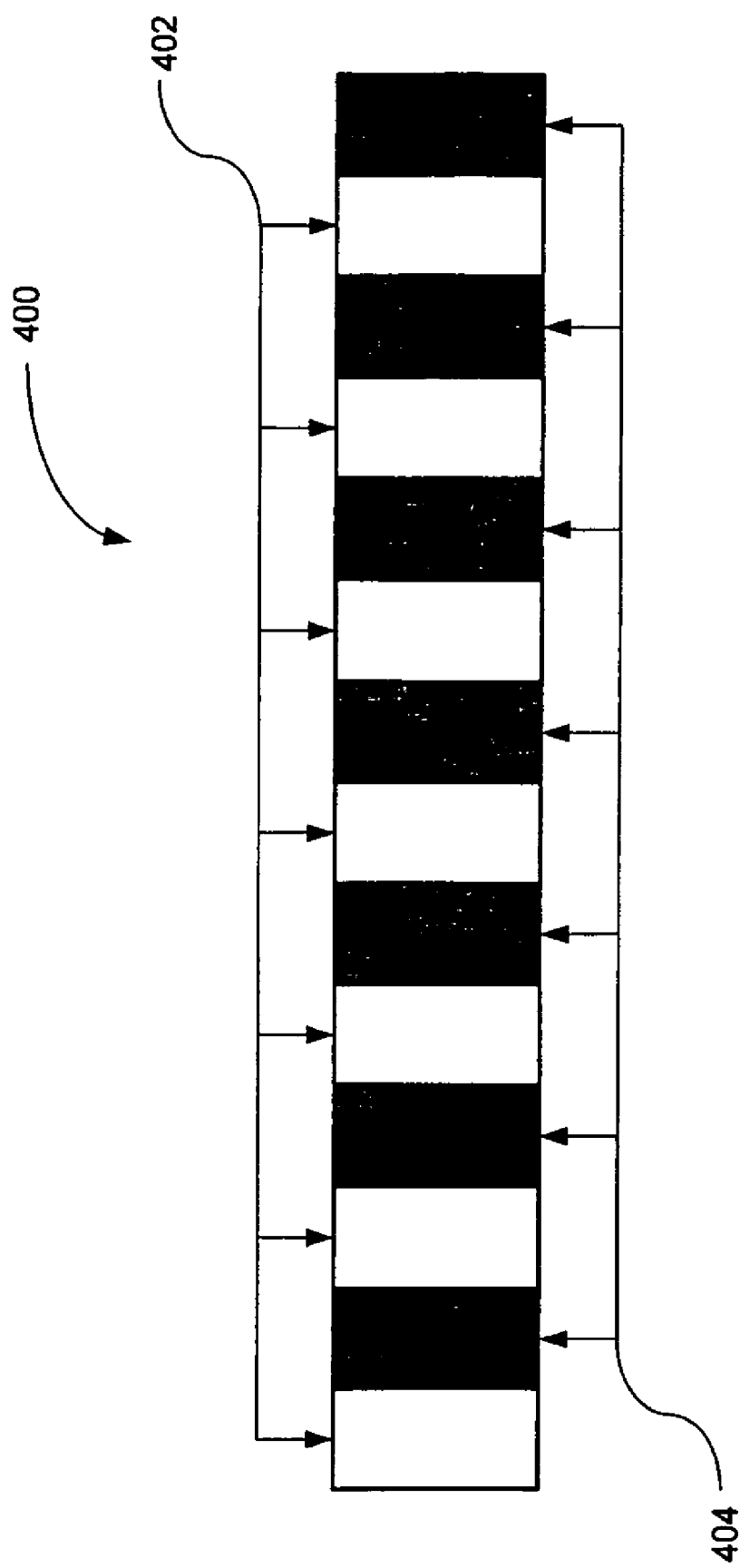
FIG. 4 shows a top-view of a typical transmissive or reflective linear encoded media utilized as a codestrip by a linear optical encoder (not shown).
Figure 5:
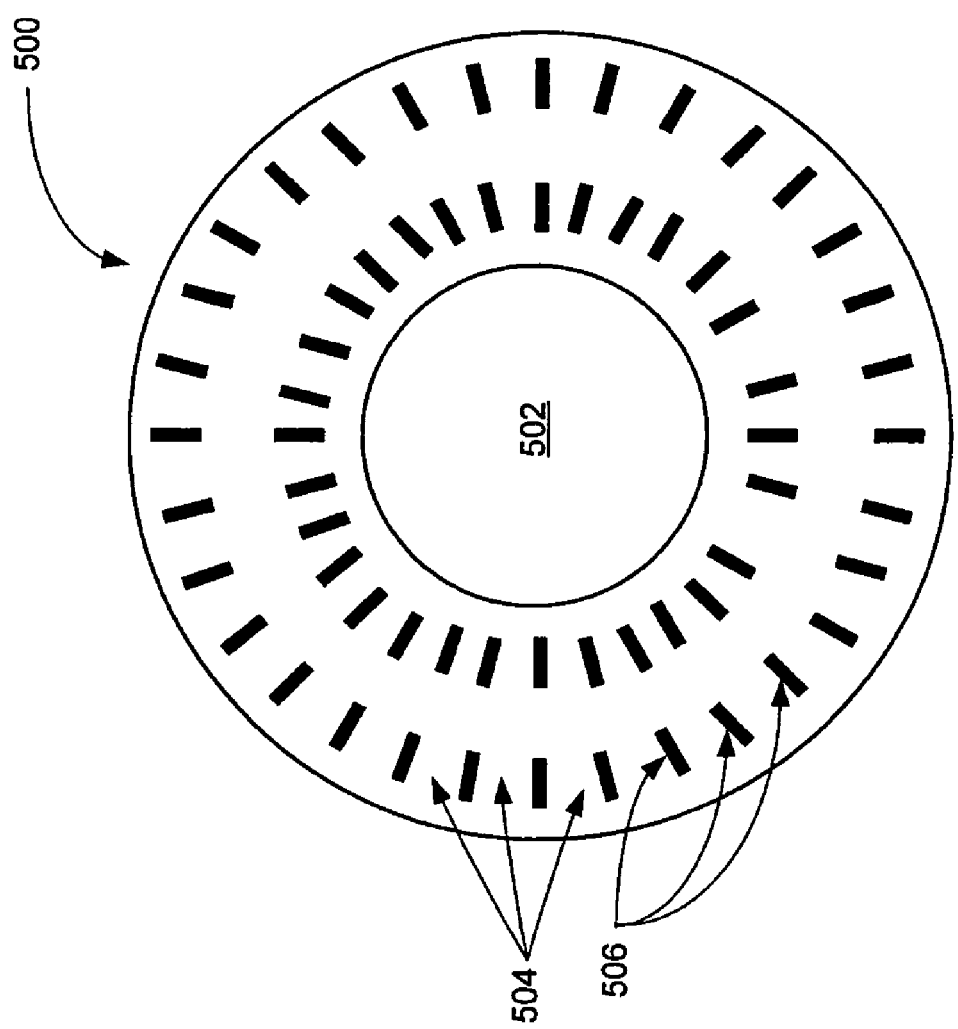
FIG. 5 shows a top-view of a typical transmissive or reflective linear encoded media utilized as a codewheel on a wheel shaft by a rotational optical encoder (not shown).
Figure 6:
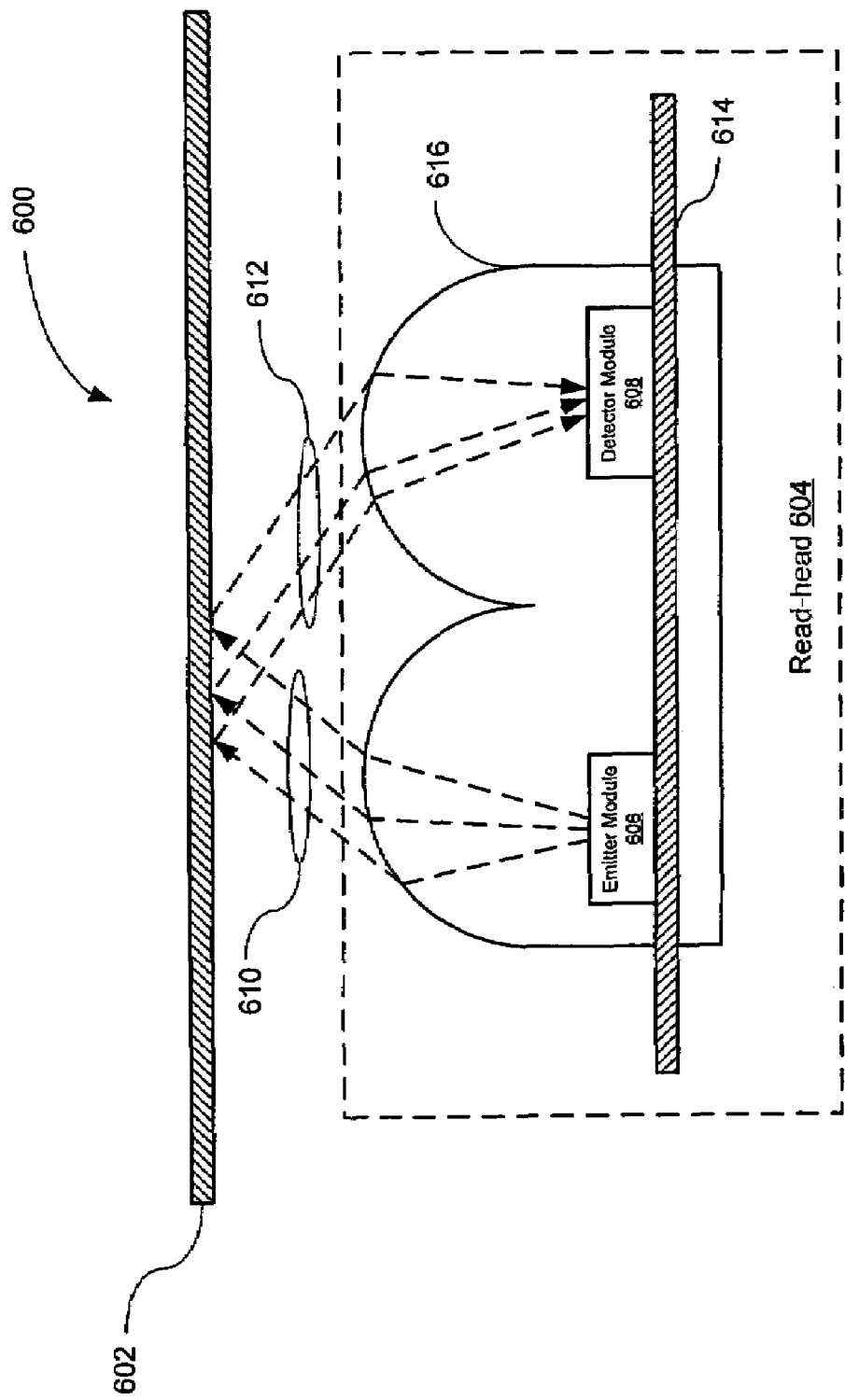
FIG. 6 shows another side cross-sectional view of a typical reflective optical encoder in combination with an encoded media.
Figure 7:
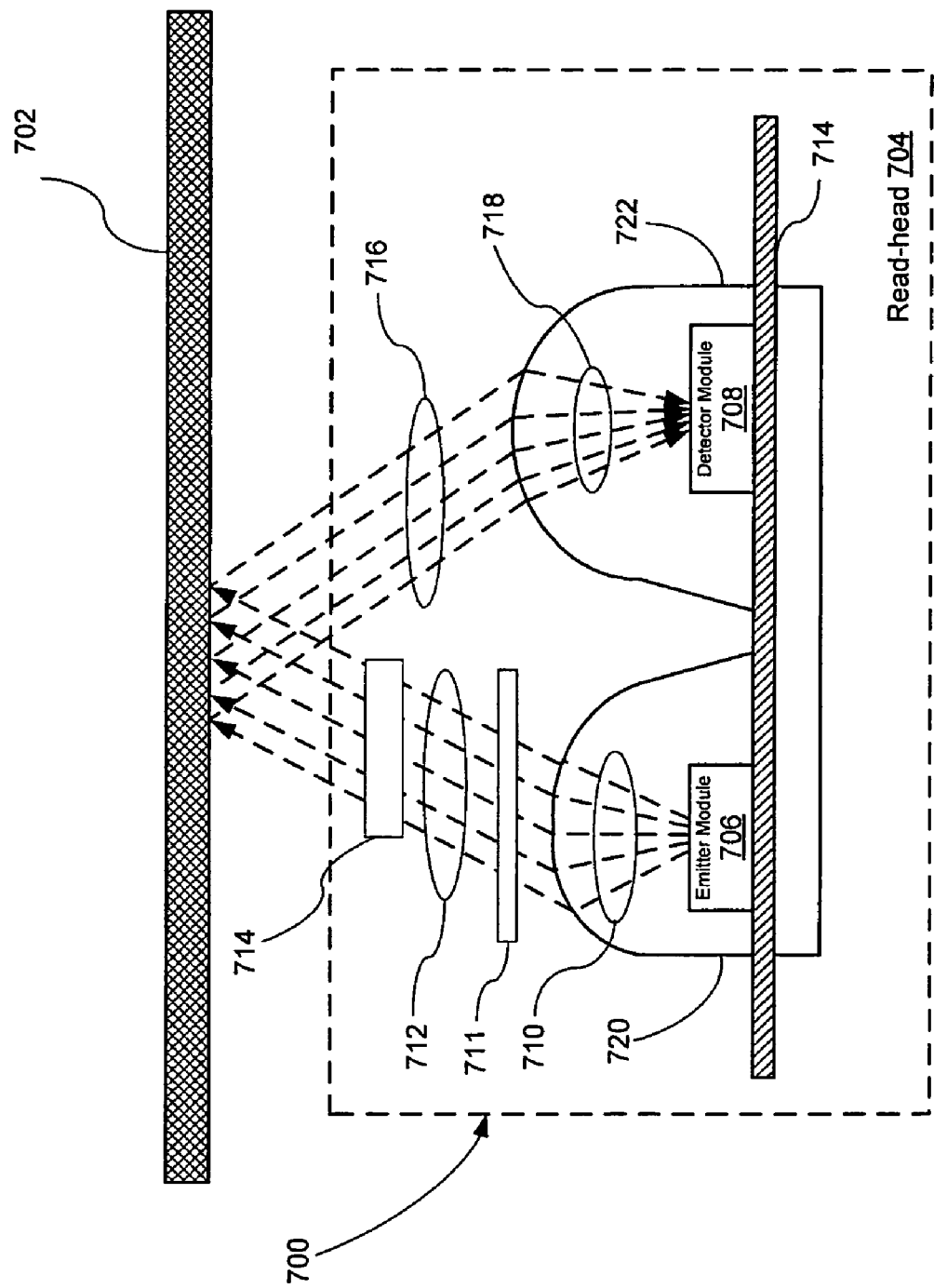
FIG. 7 shows a side cross-sectional view of an example of an implementation of an Optical Projecting Encoder ("OPE") in combination with a moving object, where the OPE includes a mask with a known pattern.

In FIG. 7, a side cross-sectional view of an example of an implementation of an OPE 700 is shown, together with a moving object 702 positioned above the OPE 700. The moving object 702 may be any movable element or component, such as print heads, imaging drums and rollers, and scan heads, whose position, velocity, or acceleration needs to be determined. The OPE 700 may include a read-head 704, where the read-head 704 may include an emitter module 706, and a detector module 708. Similarly to FIGS. 1, 2, 3 and 6, the read-head 704 and the moving object 702 may move freely relative to each other in either a linear or rotational manner based on whether the OPE 700 is either a linear or rotational optical encoder, respectively. However, unlike the optical encoders shown in FIGS. 1, 2, 3 and 6, the moving object 702 does not have an encoded or grating medium attached to it, and therefore the relative movement between the OPE 700 and the moving object 702 is entirely independent and the OPE 700 may be positioned anywhere relative to the moving object 702.

The emitter module 706 and the detector module 708 may include optics capable of emitting and detecting, respectively, optical radiation emitted from the emitter module 706 that passes through a mask 714 and is then reflected from the moving object 702 to the detector module 708. Additionally, both emitter module 706 and detector module 708 may be mounted on a common substrate 714. The common substrate 714 may be a single semiconductor substrate in an integrated circuit, a lead-frame, an insert-molded lead-frame, a printed circuit board ("PCB"), flexible circuit, ceramics substrate or micro-interconnecting device ("MID").

It is appreciated that the optical radiation may be visible, infrared, and/or ultraviolet light radiation. The emitter module 706 may include a light source (not shown) such as a diode, a LED, photo-cathode, a light bulb, and/or a laser, and the detector module 708 may include an array of photo-detectors (not shown) such as photo-diodes, photo-cathodes, and/or photo-multipliers.

The optics may include a transmissive layer having a first epoxy layer 720 capable of covering the emitter module 706 and a second epoxy layer 722 covering the detector module 708, where both the first epoxy layer 720 and second epoxy layer 722 may include any transmissive and moldable material capable of collimating the emitted optical radiation 710 into a parallel beam of optical radiation 712 directed from the emitter module 706 to the mask 714, then to the moving object 702, and concentrating the reflected optical radiation 716 into a beam of optical radiation 718 directed at the detector module 708, respectively. An additional molded lens 711 may be incorporated in the OPE 700 that further collimates optical radiation 712 in order to achieve higher accuracy.

In an example operation, the emitted optical radiation 710 is collimated first by the first epoxy layer 720 and then by the molded lens 711 into a parallel beam of optical radiation 712 that is directed to the mask 714. The mask 714 is a device having a pattern of predetermined and fixed size and dimensions such that the optical radiation 712 passing through the mask 714 takes on the same shape as the pattern of the mask 714. The optical radiation 712 after collimation should have a shape larger in surface area than the mask 714. As an example, the mask 714 may generate a rectangular pattern such that the pattern may serve as a two-dimensional reference plane having two axes, the x-axis and the y-axis, and the optical radiation 710 may be collimated into optical radiation 712 having a shape larger in area than the rectangular pattern of the mask 714.

The image cast by the mask 714 is then reflected off the moving object 702 together with an image of the surface texture of the moving object 702 in the form of a parallel beam of reflected optical radiation 716 directed to the second epoxy layer 722. The second epoxy layer 722 concentrates the reflected optical radiation 716 into a beam of optical radiation 718 directed at the detector module 708. By comparing the image cast by the mask 714 and image of the surface texture of the moving object 702, the detector module 708 is able to determine the position and motion of the moving object 702.

The transmissive layer may be used to bend the emitted optical radiation 710 as well as for packaging purposes. The color of the transmissive layer may be clear transparent if the emitter module 706 emits visible light. However, if the emitter module 706 transmits infrared radiation, the transmissive layer may be colored with black dye because the infrared radiation is capable of penetrating the black dye epoxy. Additionally, the transmissive layer may include any colored epoxy (such as red, yellow, etc).

The detector module 708 may include an optical navigation sensor. Optical navigation sensors are optical devices able to measure changes in position by acquiring sequential surface images and mathematically determining the direction and magnitude of the movement by comparing each image in succession. Examples of such optical navigation sensors are the Agilent ADNS-6000 Optical Mouse Sensor (laser) and the Agilent ADNS-3060 High-Performance Optical Mouse Laser (LED-based). FIG. 8 shows a graphical representation of an image recorded on an optical navigation sensor of a detector module of an OPE taken at time ("t")=zero. Frame 800 is the pattern created by the mask 714, FIG. 7, that is acquired by the optical navigation sensor and used as a scale to measure the relative movement of the target, the moving object 702, FIG. 7. Frame 800 contains 120 pixels arranged in a rectangle having an x-axis 802 of 10 pixels and a y-axis 804 of 12 pixels.

FIG. 8 shows the frame 800 and the image of the surface structure of the moving object 702, FIG. 7, taken at an arbitrary time ('t') equal to zero. At t=0, the optical navigation sensor detects a surface feature in the frame at a pixel with the coordinates (3, 4) 806. In FIG. 9, a graphical representation of an image 900 recorded on the optical navigation sensor of the detector module taken at t=zero+1 is shown. In FIG. 9, the movement of the surface feature with the coordinates (3, 3) at t=zero 906 to a new pixel 908 with the coordinated of (6, 10) has been detected. Thus the actual relative movement of 3 pixels horizontally and 6 pixels vertically may be calculated as follows: horizontally: (6−3)/10×x=0.3 x, and vertically: (10−4)/12×y=0.5 y.

FIGS. 8 and 9 show frames separated by a single unit of time. It is appreciated by those skilled in the art that known optical navigation sensors may acquire and process frames at various rates, measured as frames per second ('fps'), and that some optical navigation sensors operate at rates in excess of 6400 fps. Therefore the process shown in FIGS. 8 and 9 will be repeated continuously while the optical navigation sensor continues to acquire and process pattern and surface images. It is also appreciated by those skilled in the art that the resolution of the OPE is dependent on the numbers of pixels in the optical navigation sensor and their size. Resolution may be expressed in counts-per-inch ("cpi"). As an example, optical navigation sensors in optical mice with resolutions of 400 and 800 cpi are suitable for most office applications. Other mice are available with higher resolution, up to 2000 cpi. As another example of an optical navigation sensor, Agilent ADCC-3960 Landscape 1.3 Megapixel CMOS Image Sensor (with JPEG) has 1.3 megapixels in a 1,304 H×1,034V array format, with a pixel size of 3.3 μm, resulting in resolution of approximately 7,697 lines per inch.

It will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed:

1. An Optical Projection Encoder ("OPE") comprising:
an emitter module including a light source configured to transmit emitted optical radiation to a moving object;
a detector module including an array of photo-detectors to receive reflected optical radiation from the moving object;
a transmissive layer configured to encapsulate both the emitter module and the detector module; and
a mask located between the transmissive layer and the moving object, wherein the emitted optical radiation is passed through the mask, with the mask generating an image of a predetermined pattern that is reflected from the moving object to the detector module together with an image of the surface texture of the moving object, wherein the detector module is configured to acquire a comparison image using the emitted optical radiation reflected from the moving object, the comparison image including the image of the predetermined pattern and the image of the surface texture of the moving object.

2. The OPE of claim 1, wherein the predetermined pattern is a two-dimensional pattern having a particular shape such that the image of the predetermined pattern includes an enclosed frame in the form of the outline of the particular shape and the image of the surface texture of the moving object is an image of the surface texture positioned within the enclosed frame.

3. The OPE of claim 2, wherein the transmissive layer collimates the emitted optical radiation from the emitter module into a shape that is larger than the predetermined pattern.

4. The OPE of claim 3, wherein the predetermined pattern is a two-dimensional rectangular pattern having an x-axis and a y-axis such that the image of the predetermined pattern includes a rectangular frame and the image of the surface texture of the moving object is a rectangular image of the surface texture positioned within the rectangular frame.

5. The OPE of claim 3, wherein the detector module includes an optical navigation sensor.

6. The OPE of claim 5, wherein the optical navigation sensor acquires a plurality of images wherein each image includes an image of the predetermined pattern and an image of the surface texture of the moving object.

7. The OPE of claim 6, wherein the optical navigation sensor compares each image of the predetermined pattern and each image of the surface texture of the moving object.

8. The OPE of claim 7, wherein the optical navigation sensor determines the relative motion of the moving object from the comparison of the image of the predetermined pattern and the image of the surface texture.

9. The OPE of claim 5, wherein the transmissive layer concentrates the reflected optical radiation from the moving object into the optical navigation sensor.

10. The OPE of claim 9, wherein the emitter module and detector module are located on a common substrate.

11. The OPE of claim 10, further including a molded lens that further collimates the emitted optical radiation from the emitter module.

12. A method for determining the relative motion of a moving object, the method comprising:
emitting optical radiation from an emitter module;
passing the emitted optical radiation through a mask having a predetermined pattern such that the emitted optical radiation conforms to the predetermined pattern;
illuminating the moving object with the emitted optical radiation that conforms to the predetermined pattern;
reflecting the emitted optical radiation including the image of the predetermined pattern and an image of the surface texture of the moving object from the moving object to a detector module; and
acquiring a comparison image at the detector module using the emitted optical radiation reflected from the moving object, the comparison image including the image of the predetermined pattern and the image of the surface texture of the moving object.

13. The method of claim 12, wherein the detector module includes an optical navigation sensor.

14. The method of claim 13, further including:
collimating the emitted optical radiation using a transmissive layer that encapsulates both the emitter module and the detector module; and concentrating the reflected emitted optical radiation into the optical navigation sensor using the transmissive layer.

15. The method of claim 14, wherein the emitted optical radiation is collimated into a shape that is larger than the predetermined pattern.

16. The method of claim 15, further including:

acquiring a plurality of images reflected from the moving object in the optical navigation sensor wherein each image includes an image of the predetermined pattern and an image of the surface texture of the moving object.

17. The method of claim 16, further including:

comparing each image of the predetermined pattern and each image of the surface texture of the moving object; and determining the relative motion of the moving object from the comparison of each image of the predetermined pattern and each image of the surface texture.

18. The method of claim 17, wherein the predetermined pattern is a two-dimensional rectangular pattern having an x-axis and a y-axis.

19. The method of claim 18, wherein the relative motion of the moving object is determined along both the x-axis and the y-axis.

20. The method of claim 12, wherein the predetermined pattern is a two-dimensional pattern having a particular shape such that the image of the predetermined pattern includes an enclosed frame in the form of the outline of the particular shape and the image of the surface texture of the moving object is an image of the surface texture positioned within the enclosed frame.

* * * * *